(No Model.) 2 Sheets—Sheet 1.
H. HAUSER & O. BÜNZLI.
APPARATUS FOR PRODUCING CARBONIC ACID DRINKS.
No. 566,172. Patented Aug. 18, 1896.
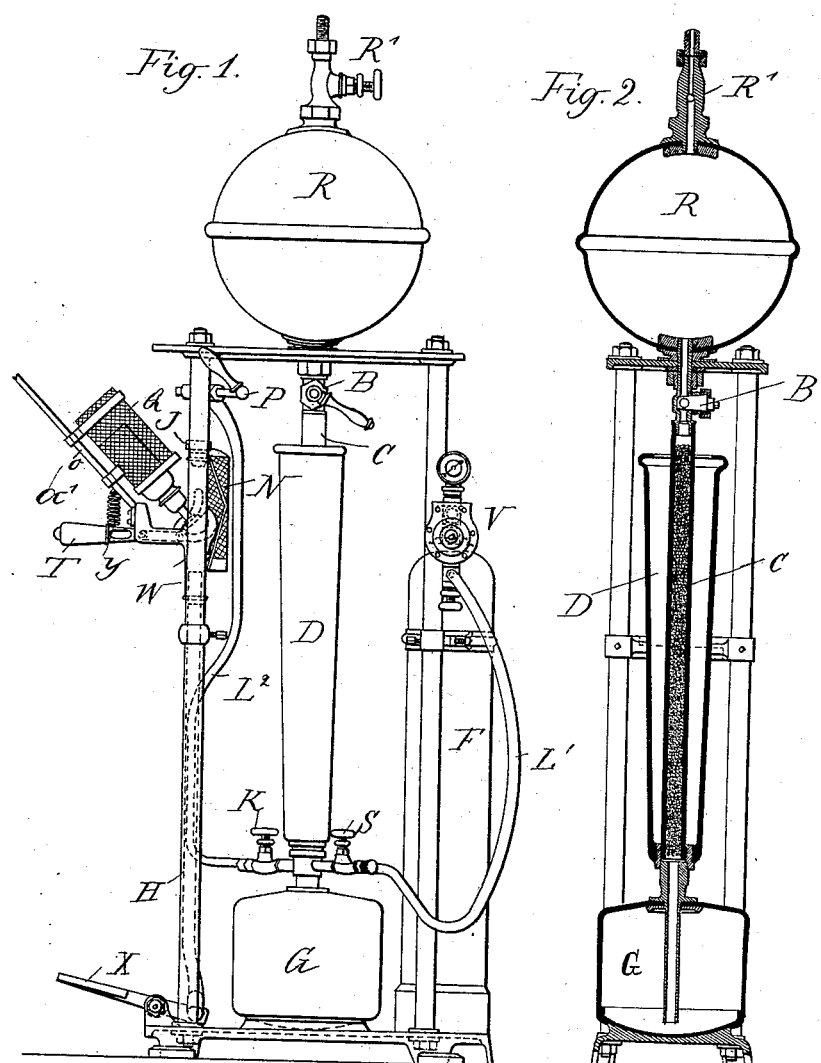
Witnesses.
John C. Wilson
Percy C. Bowen
Inventor:
Herman Hauser
Oscar Bünzli
By Whitman & Wilkinson,
Attorneys.

(No Model.)
H. HAUSER & O. BÜNZLI.
APPARATUS FOR PRODUCING CARBONIC ACID DRINKS.
No. 566,172.
Patented Aug. 18, 1896.
2 Sheets—Sheet 2.
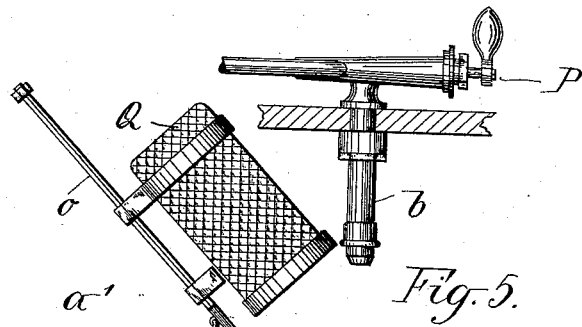
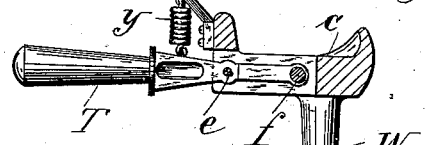
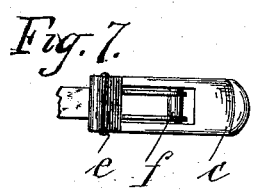
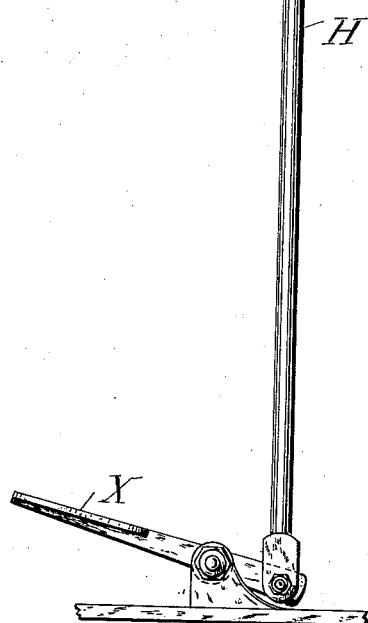
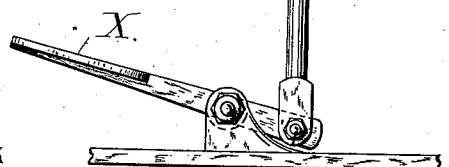

UNITED STATES PATENT OFFICE.

HERMAN HAUSER AND OSCAR BÜNZLI, OF ZURICH, SWITZERLAND.

APPARATUS FOR PRODUCING CARBONIC-ACID DRINKS.

SPECIFICATION forming part of Letters Patent No. 566,172, dated August 18, 1896.

Application filed December 26, 1895. Serial No. 573,328. (No model.) Patented in Denmark October 24, 1895, No. 777/95.

*To all whom it may concern:*

Be it known that we, HERMAN HAUSER and OSCAR BÜNZLI, both citizens of the Republic of Switzerland, residing at Zurich, Switzerland, have invented a new and useful Apparatus for Producing Carbonic-Acid Drinks, (for which we have obtained Letters Patent in Denmark, No. 777/95, dated October 24, 1895,) of which the following is a specification.

Our invention relates to improvements in apparatus for aerating and bottling beverages, and has for its object to provide an apparatus by means of which the liquid to be aerated is distributed so as to offer to the carbonic acid the greatest surface, thus insuring the most thorough impregnation.

Our invention also has for its object the cooling of the liquid simultaneously with the operation of saturating the same with carbonic acid; and the said invention consists in the novel devices hereinafter described and claimed.

Reference is had to the accompanying drawings, wherein the same parts are indicated by the same letters throughout the several views.

Figure 1 represents a side elevation of our improved apparatus. Fig. 2 represents a vertical sectional view taken through the center of the supply-tank, cooling-tank, and receiving-tank shown in Fig. 1. Fig. 3 is a sectional plan view of Fig. 1. Fig. 4 is an enlarged detail sectional view of a modified form of holding-block for the bottle to be filled. Fig. 5 is an enlarged detail view, partly in section, of the devices for holding and filling the bottles. Fig. 6 is a similar view of another form of device for holding the bottles to be filled. Fig. 7 is a fragmentary plan view of the shoe portion of the apparatus shown in Fig. 5.

Our apparatus is composed of a cylindrical reservoir C, which communicates with the reservoir F for holding the acids, as well as with the other reservoir of liquids R, and to the drawing-off apparatus P H A'. The reservoir C contains a granulated material through which the liquid to be carbonated percolates. This granulated material may consist of small pebbles or almost any granular substance not easily affected by water and carbon dioxid. Surrounding the reservoir C is a tank D, which is filled with ice or other cooling substance in order to reduce the temperature of the liquid commingling with the carbon dioxid.

There are arranged at the base of the reservoir C two stop-cocks S and K, opposite to each other, by means of which the cylinder C may be connected with the reservoir for carbonic acid through the connection L', and the liquid after being carbonated may be drawn off through the connection L². The connection L² may consist of any convenient form of pipe, and is connected at one end to the valve P and at its other end to the valve or stop-cock K, and the stop-cock communicates with the opening at the base of the reservoir C, which opening communicates with both the said reservoir C and the chamber G.

It will be seen that the base is prolonged to extend into the receptacle G.

Above the cylinder C is a reservoir R for containing the liquid to be carbonated, which reservoir is connected by means of the cock B with the cylinder C.

The devices for holding the bottles to be filled is composed of a movable iron bar H, bearing the drawing-post proper, a', in a manner which allows it to be lifted off of said bar, and said bar is provided with a tread-board X for lifting the same.

The drawing-off devices consist of a shoe or seat W, formed like a ladle in that part which supports the end of the siphon-bottle, and a lever T, pivoted thereto and normally held by a spiral spring Y.

The safety-basket Q is mounted upon an iron rod o and may be moved along this rod. In this basket the body of the siphon-bottle rests while being filled.

The operation of that part of the apparatus which relates to the carbonating of the liquid is as follows: The carbonic acid after being passed in due degree, by means of a reduction-valve V, into the reservoir F is let out therefrom and flows along the pipe or connection L' and through the stop-cock S below to the bottom of the drizzling apparatus C, whence it will slowly rise in said reservoir C. Now if the cock B be opened the liquid from the reservoir R will flow slowly downward, and meeting the carbonic acid rising in the cooling-reservoir C the pressure upon the liquid from above, through the reduction-valve R', will cause the said liquid and carbonic acid to flow downward together and become intimately mixed, and the liquid saturated with the carbonic acid will fall into the reservoir G, where it is held ready to be drawn off by means of the cock K. When this cock K is opened, the carbonated liquid will, by reason of the pressure within said chamber G, be forced upward through the pipe $L^2$ and may be drawn off into the bottles to be filled through the cock P. The operation of this drawing-off apparatus is as follows: The siphon-bottle is placed upon the holding device in such manner that its head will rest in the bowl portion of the ladle-shaped seat with its mouth turned upward. Then by bearing down on the treadle X the mouth of the bottle will be raised up, so that the nozzle $b$ will enter the same. Then by bearing down with one hand on the lever-arm T the opposite end $f$ thereof will engage the lever on the mouth of the siphon-bottle and open the valve thereof. If the cock P now be opened, the carbonated liquid will enter the mouth of the bottle until it is shut off again and the bottle is full. Then by releasing the lever T the valve in the bottle will be closed, and by releasing the foot-treadle X the bottle may be taken out, and the operation repeated with a new bottle.

The devices shown in Figs. 4 and 6 are for use in holding bottles in an upright position, as would be the case with bottles having ball-valves in their necks, which will automatically close the said bottles when filled.

There may be combined for wholesale industry two apparatuses of this kind in the said frame, in which case the reservoir containing the carbonic acid should be placed between the two apparatuses, thus allowing two workmen to be employed in filling out at the same time.

Having thus described our invention, what we claim, and desire to secure by Letters Patent of the United States, is—

1. In an apparatus for producing carbonated beverages the combination with the reservoir R, provided with the reducing-valve R', of a reservoir C containing a granular substance and connected to the reservoir R through a valve B, a chamber D surrounding the reservoir C and adapted to be filled with ice or other cooling substance, a receptacle G located under the reservoir C, a neck affording communication between the said reservoir and receptacle G and prolonged to extend down into the latter, a gas-reservoir communicating with reservoir C, and provided with a reducing-valve, a valve S connected to the aforesaid neck and inserted in the said communication, a second valve K communicating with the receptacle G as well as with the reservoir C, a vertical framework surrounding and supporting the said reservoirs, a bottling apparatus connected to the said framework and means for drawing carbonated liquid from the receptacle G to the bottling apparatus, substantially as described.

2. In a device for filling bottles, the combination with a tread-lever X, of an upright shaft H connected to the said lever and adapted to be held in bearings; a ladle-shaped shoe W carried by the upper end of the shaft H; a lever T fulcrumed at $e$ in the shoe W; a rod mounted on the said shoe; a safety-basket Q mounted on the said rod and adapted to slide on the said rod; a spring attached to the power-arm of the aforesaid lever T and to the rod $a$; a nozzle $b$ and a valve P, and means for conveying the liquid to the filling device, substantially as and for the purpose set forth.

In testimony whereof we have signed our names to this specification in the presence of two subscribing witnesses.

HERMAN HAUSER.
OSCAR BÜNZLI.

Witnesses:
ARNOLD R. LANG,
H. LABHART.